United States Patent [19]

Kuo

[11] 3,931,349

[45] Jan. 6, 1976

[54] CONVERSION OF METHANOL TO GASOLINE COMPONENTS

[75] Inventor: James C. W. Kuo, Cherry Hill, N.J.

[73] Assignee: Mobil Oil Corporation, New York, N.Y.

[22] Filed: Sept. 23, 1974

[21] Appl. No.: 508,113

[52] U.S. Cl. .......... 260/668 R; 208/135; 260/614 R; 260/673; 260/682
[51] Int. Cl.² ................... C10G 37/06; B01J 29/28
[58] Field of Search ...................................... 260/668

[56] References Cited
UNITED STATES PATENTS

| | | | |
|---|---|---|---|
| 2,456,584 | 12/1948 | Gorin | 260/668 |
| 3,728,408 | 4/1973 | Tobias | 260/668 C |
| 3,756,942 | 9/1973 | Cattanach | 208/137 |
| 3,760,024 | 9/1973 | Cattanach | 260/673 |
| 3,984,105 | 7/1975 | Chang et al. | 260/668 R |
| 3,984,106 | 7/1975 | Chang et al. | 260/668 R |
| 3,984,107 | 7/1975 | Chang et al. | 260/668 R |

*Primary Examiner*—Delbert E. Gantz
*Assistant Examiner*—G. E. Schmitkons
*Attorney, Agent, or Firm*—Charles A. Huggett; Carl D. Farnsworth

[57] ABSTRACT

A process is described for the production of aromatics boiling in the gasoline boiling range from methanol carried out in two stages wherein a heat dissipating diluent is employed in the second stage during contact with a crystalline zeolite catalyst selective for the purpose and the first stage exothermic temperature rise is catalytically restricted.

9 Claims, 4 Drawing Figures

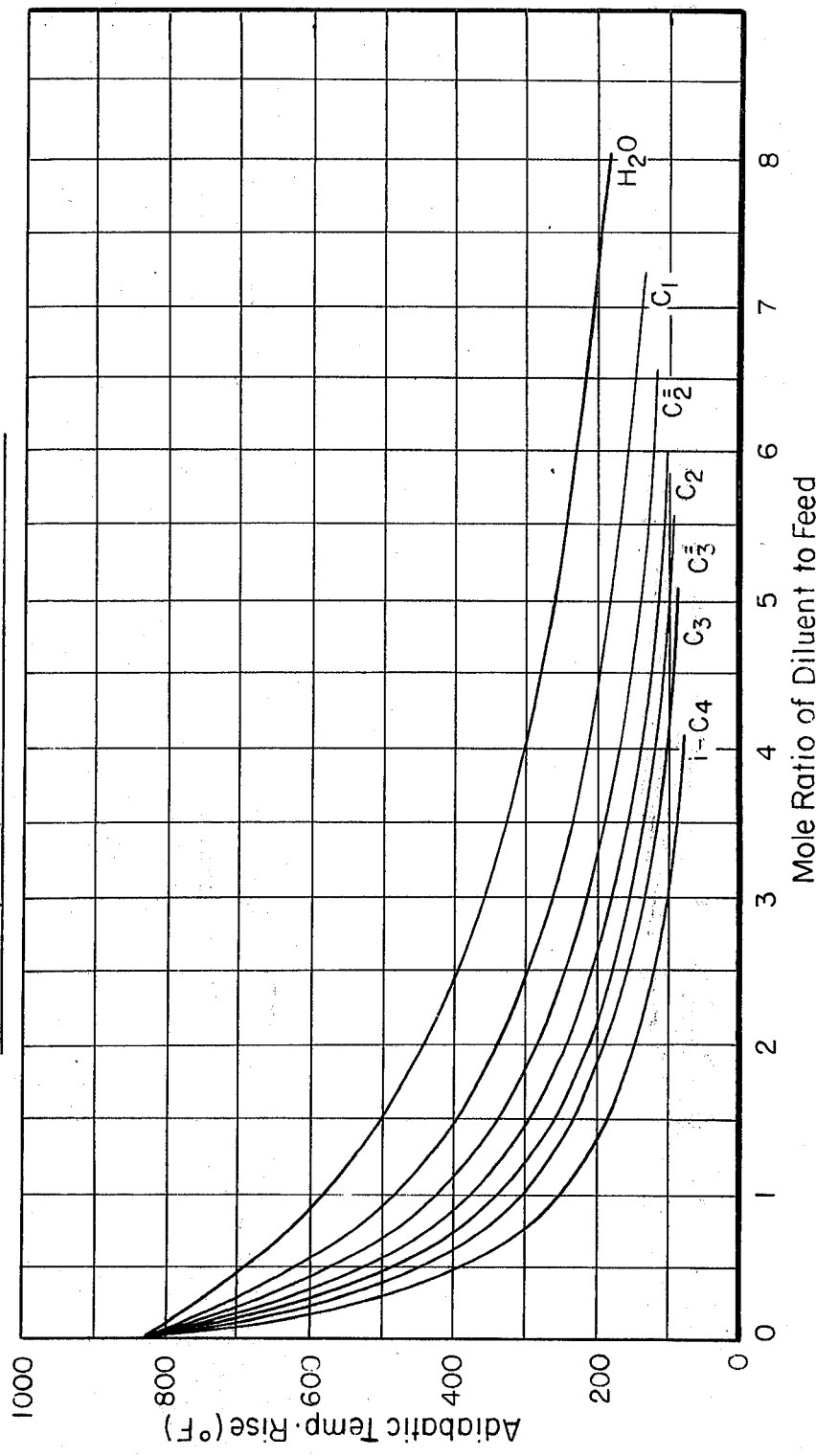

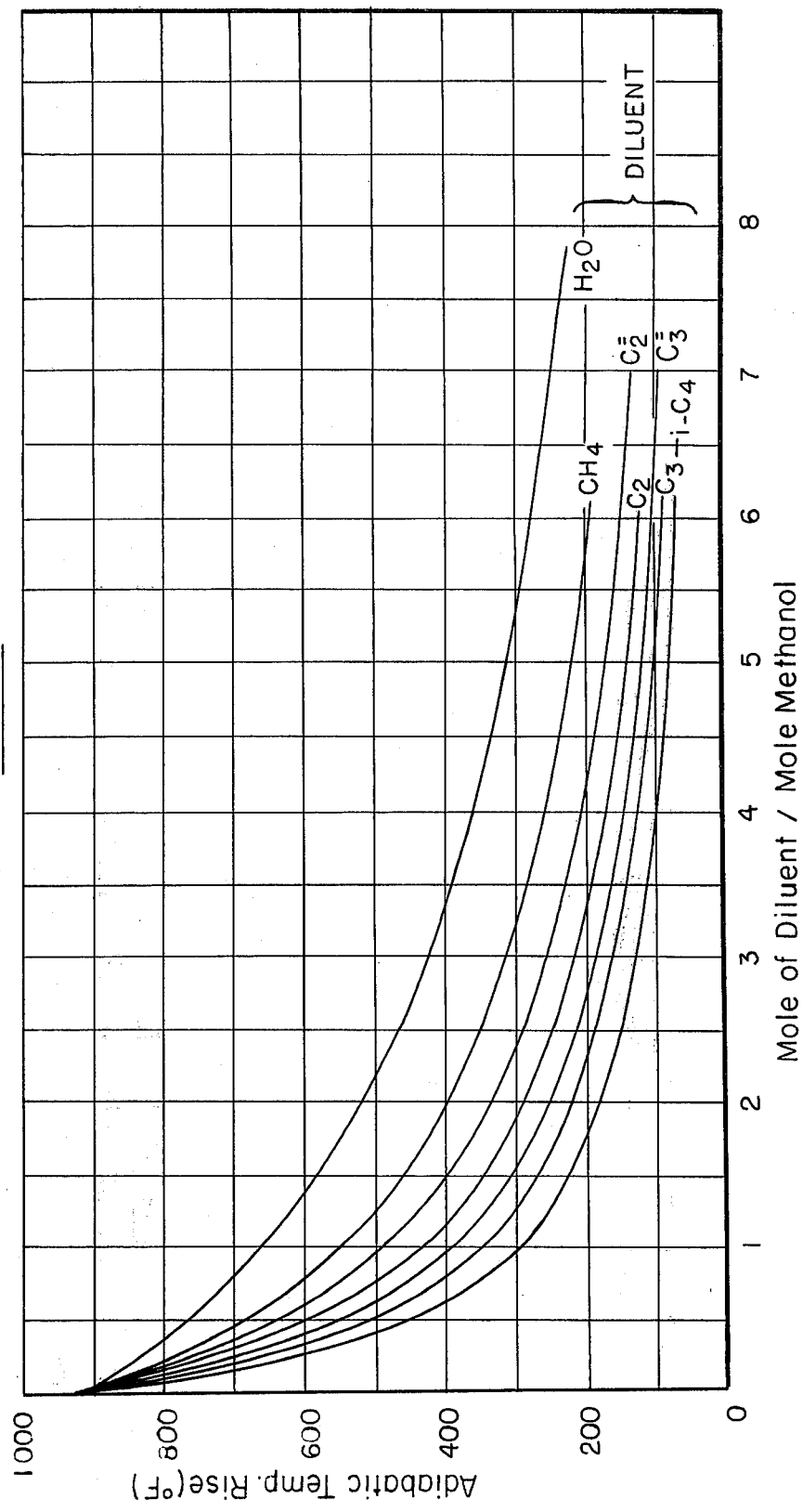

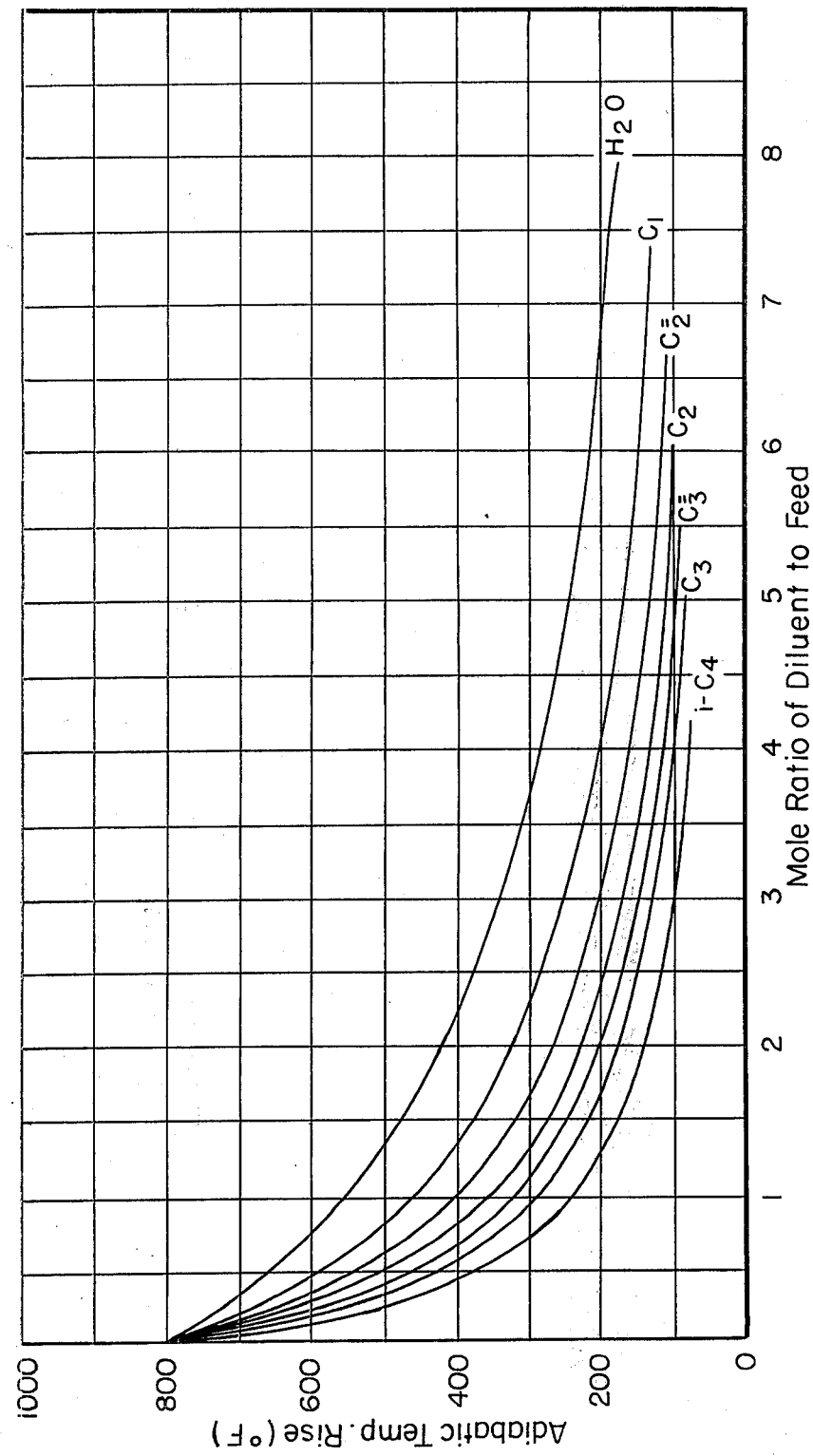
FIG. III ESTIMATED ADIABATIC TEMPERATURE RISE IN HZSM-5 REACTOR BASED ON CRUDE METHANOL (CONTAINING 16 WEIGHT % WATER) WITH DIFFERENT DILUENTS
Reactor Inlet Condition: Equilibrium Mixture of Methanol, Water, DME and Diluent at 600°F

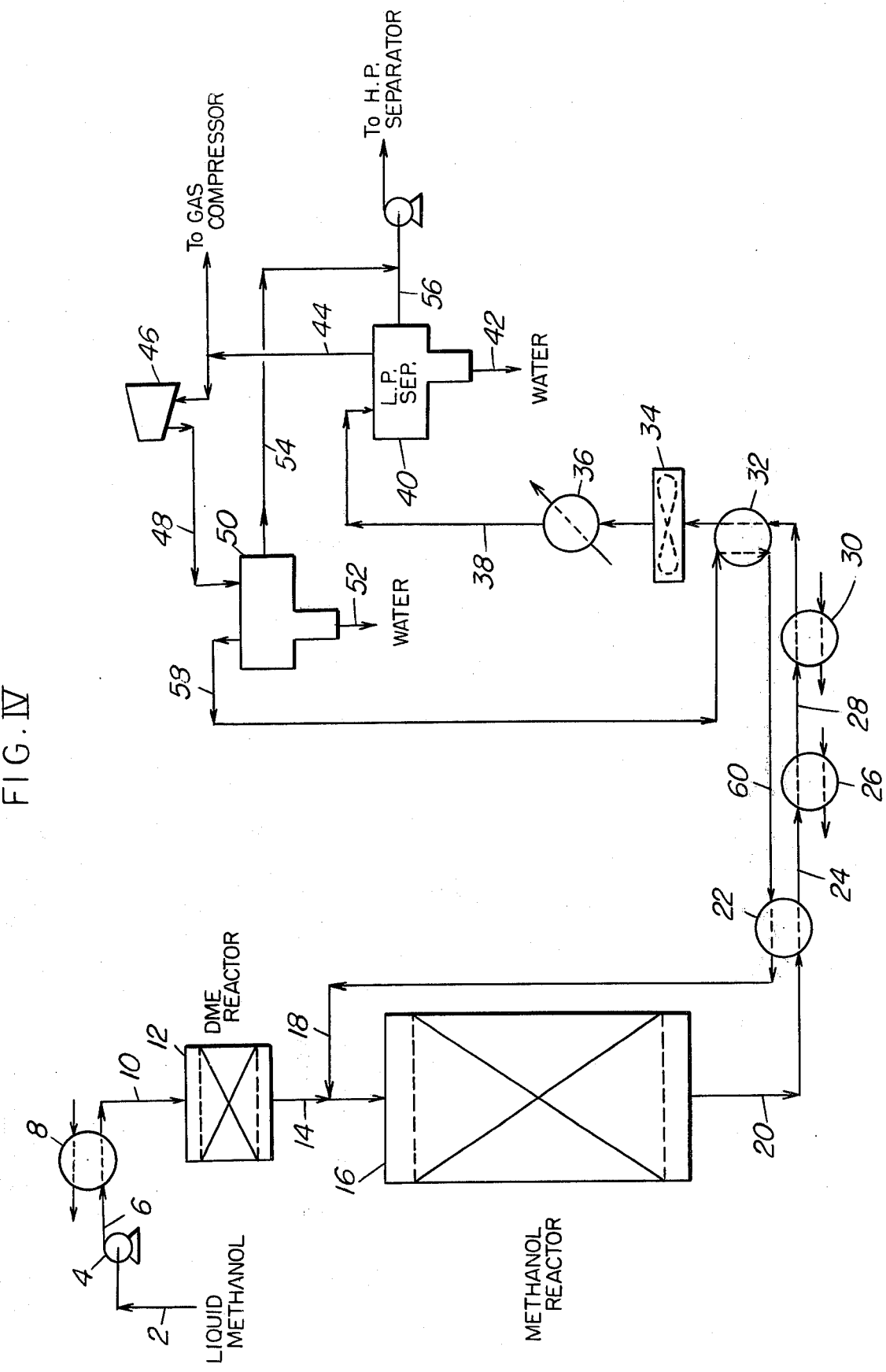

CONVERSION OF METHANOL TO GASOLINE COMPONENTS

BACKGROUND OF THE INVENTION

The exothermic conversion of the lower alcohols such as methanol to its corresponding ether has been known to take place in the presence of certain catalysts such as gamma alumina.

Copending application Ser. No. 387,223 filed Aug. 9, 1973 (now U.S. Pat. No. 3,984,107), discloses the conversion of alcohols to a reaction product containing water and highly aromatic, gasoline boiling range hydrocarbons by contact with a crystalline zeolite having a silica to alumina ratio of at least about 12 and a constraint index of about 1 to 12.

Other copending applications of interest include Ser. No. 387,222 filed Aug. 9, 1973 (now U.S. Pat. No. 3,984,106); Ser. No. 358,192 filed May 7, 1973 (now abandoned) and Ser. No. 130,442 filed Apr. 11, 1971 (now abandoned). U.S. Pat. Nos. 3,702,886 issued Nov. 14, 1972 and 3,709,979 issued Jan. 9, 1973 are also of interest.

SUMMARY OF THE INVENTION

This invention relates to the method and system for converting methanol to gasoline boiling components. More particularly, the present invention relates to the sequential restructuring of methanol through a plurality of catalyst contact zones temperature restrained in response to catalyst activity and selectivity. The invention relates to accomplishing the sequential restructuring of vaporized methanol first to ether and then to aromatics and isoparaffins boiling in the gasoline boiling range. In another aspect, the present invention relates to the method and combination of processing steps for catalytically restricting the conversion of methanol and the exothermic temperature rise encountered in the restructuring operation to formed ether as well as formed isoparaffin and aromatic components during contact with catalyst compositions suitable for such conversion.

In the operation contemplated by the present invention, the large amount of heat released during the conversion of methanol to gasoline boiling components is controlled in a sequentially arranged fixed catalyst bed system. The methanol feed is vaporized and converted initially to a mixture of dimethyl ether, methanol and water by contact with a suitable mass of catalyst, such as, gamma alumina wherein the reaction heat generated amounts to within the range of about 15 to 20% of the total heat release for the complete conversion of the methanol charge to gasoline boiling components. This initial reaction heat so generated is released essentially under self-limiting conditions since the reaction step is catalytically limited. The initial conversion of the methanol feed with the alumina catalyst acts to further heat the reactant by the partial conversion reaction heat and bring the resultant reactant stream to a temperature sufficiently high to initiate the subsequent conversion thereof to gasoline boiling range aromatics upon contact with a ZSM-5 type crystalline zeolite. In this combination of operating restraints it has been found desirable to dilute the effluent from the gamma alumina conversion step with a light hydrocarbon gas comprising $C_5$ and lower boiling hydrocarbons which are used primarily as a heat sink and carrier to remove the remaining generated exothermic heat during the crystalline zeolite contact step. Water may also be used for this purpose but the use of additional amounts of water is considered a less desirable diluent material for reasons herein expressed. In the combination operation above described, the maximum temperature variation or increment in the crystalline catalyst system will be maintained within carefully controlled limits thereby enhancing the combination to which the present invention is directed.

The conversion of methanol to gasoline boiling components is a highly exothermic reaction releasing approximately 750 BTU of heat per pound of methanol. This amount of heat release will result in an adiabatic temperature increase of about 1200°F. for pure methanol feed. In an adiabatic catalyst bed reactor, this large temperature increase will result in high catalyst aging rates, and possibly cause thermal damage to the catalyst. Furthermore, such high temperatures could cause an undesirable product distribution to be obtained. Therefore, it is critical to the conversion of methanol to useful products to provide sufficient heat removing or dissipating facilities particularly during initial contact with the crystalline zeolite conversion catalyst so that the maximum temperature encountered in any portion of the zeolite catalyst conversion step is below an upper predetermined limit.

It is clear from the above brief discussion that a combination of at least two separate reaction temperature control mechanisms are relied upon and used in the combination of this invention. These temperature control mechanisms include a selective self-limiting catalyst relied upon to promote the conversion of methanol to dimethyl ether and thus partially heat the reactant to an elevated temperature suitable for the further conversion of a reactant product thereof with a ZSM-5 type crystalline zeolite to components boiling in the gasoline boiling range. The other temperature control mechanism particularly employed is directed to using a heat dissipating gasiform material in combination with the reactant charge passed to the crystalline zeolite conversion step. Thus, the present invention relies upon the use of light hydrocarbon gases, $C_5$ and lower boiling material alone or in combination with the water product of the initial conversion step to dilute the ether product effluent before contacting the ZSM-5 zeolite catalyst. By using a proper dilution ratio, the exothermic temperature rise in the ZSM-5 catalyst system is readily controlled within desired practical limits. The light hydrocarbon gases thus employed are easily separated from the higher boiling gasoline boiling components and can be recycled to the reactor inlet as diluent as provided above. In the event that water is used alone as a diluent it may be separated in a low pressure separator downstream of the reactor and recycled as herein discussed.

The catalyst systems contemplated in the combination process of the present invention are selected from catalyst compositions particularly promoting the sequence of conversion steps herein defined. Thus it is proposed to use in the initial methanol conversion step, a selective catalyst composition which will restrict the conversion of methanol to an ether and thus its exothermic temperature rise. Preferably the catalyst should release only a portion of the total exothermic heat resulting from the conversion of methanol to gasoline boiling components. A catalyst suitable for this purpose in the ether forming step is gamma alumina. The crystalline zeolite conversion catalyst relied upon to convert the dimethyl ether product formed from the methanol charge and any unconverted methanol in the ether containing effluent is preferably a ZSM-5 crystalline zeolite material. However, other crystalline zeolites providing activity-selectivity characteristics similar to ZSM-5 crystalline zeolite such as ZSM-5 type materials comprising ZSM-11, ZSM-12, ZSM-21 and TEA mordenite may be employed.

The conversion of the methanol charge to an ether rich effluent or equilibrium mixture comprising methanol and water will be accomplished at a pressure within the range of 15 to 175 psig. A low pressure operation is desirable since the formation of undesirable high molecular weight aromatic compounds such as durene can be minimized. Therefore it is preferred that the catalyst employed in the initial ether forming reaction zone be arranged to provide a low pressure drop system. A reactant radial flow fixed bed catalyst arrangement is one arrangement suitable for this purpose. In such a system, the methanol inlet temperature is preferably about 400°F. and may be within the range of 400°F. to about 600°F. The methanol is charged to the system at a rate of 10 or lower space velocity (LHSV) based on pure liquid methanol. Conversion of the methanol charge to an ether rich effluent will release sufficient heat to raise the temperature of the effluent to within the range of 600° to 800°F. The ether rich effluent is mixed with a diluent material as defined above and preferably $C_5$ and lighter hydrocarbons in an amount sufficient to act as the heat carrier and provide a mixture at a temperature of about 600°F. which is a desired inlet temperature for completing the conversion of the ether rich effluent as well as unconverted methanol by contact with the crystalline zeolite ZSM-5 catalyst. The crystalline zeolite conversion operation is maintained at a pressure within the range of 15 to 170 psig and preferably at a pressure sufficiently below the upstream alumina catalyst reactor pressure to permit the cascade of product effluent without intermediate compression. A space velocity of 1 based on pure methanol and 1 atmospheric partial pressure is preferred in the crystalline zeolite conversion step. FIGS. I–III show the estimated adiabatic temperature rise in the ZSM-5 catalyst conversion step for pure methanol and crude methanol containing 12 and 16 weight percent water as feed to the alumina conversion step. A reasonable temperature increase across the ZSM-5 reactor is estimated to be in the range of 150°F. to about 250°F. Therefore the dilution ratio required using light hydrocarbon gas, $C_5$ and lighter, will be selected from within the range of about 1.0 to 5 based on pure methanol feed and less than about 3 based on crude methanol feed containing about 16 weight percent of water. In an operation using steam as the diluent, the estimated dilution ratio will be about 8.0 for pure methanol and about 6.5 for crude methanol feed. Crude methanol contains from about 10 to about 20 percent water.

The fixed catalyst bed processing combination of this invention offers several significant advantages for the conversion of methanol to gasoline boiling components. For example, a relatively inexpensive catalyst is initially employed to dissipate a substantial portion of the potential exothermic heat to be generated in the conversion operation; the combination operation significantly reduces the temperature control problems of such a conversion; the reaction streams are essentially once through plug flow type operations controlled to restrict the formation of undesired heavy aromatics such as durene; and high quality gasoline boiling components are formed within the operating restraints of the combination. Maintaining a relatively low reactant partial pressure in the ZSM-5 conversion stage will tend to reduce the formation of undesired heavy aromatics; the use of light hydrocarbons as heat carrying and dissipating diluent will extend the useful life of the ZSM-5 catalyst; and negligible loss through attrition of the more expensive ZSM-5 catalyst will be minimized by the fixed catalyst bed system used in the combination operation.

BRIEF DESCRIPTION OF THE DRAWINGS

FIG. I is a plot of the estimated temperature rise data for the ZSM-5 catalyst reactor based on processing crude methanol containing 12 weight percent water combined with different diluents.

FIG. II is a plot of the estimated temperature rise data for the ZSM-5 catalyst reactor based on processing pure methanol admixed with different diluents.

FIG. III is a plot of the estimated temperature rise data for the ZSM-5 catalyst reactor based on processing methanol containing 16 weight percent water combined with different diluents.

FIG. IV is a schematic process flow arrangement for converting methanol in two separate sequentially arranged fixed catalyst beds with diluent injection between catalyst beds.

DISCUSSION OF SPECIFIC EMBODIMENTS

FIG. I is a plot of the estimated data directed to showing the adiabatic temperature rise to be encountered in a reactor containing a bed of ZSM-5 crystalline zeolite when processing the equilibrium mixture of dimethyl ether, water and methanol obtained from crude methanol feed containing 12 weight percent of water in the presence of different diluent materials. It will be observed from the data of FIG. I that the higher the molecular weight of the hydrocarbon diluents the more effective is the heat dissipating effect and the ratio of hydrocarbon diluent to feed can be reduced as the molecular weight of the hydrocarbon diluent is increased.

FIG. II similar to FIG. I is a plot of the estimated data directed to showing the adiabatic temperature increase expected based on processing the equilibrium mixture from pure methanol over a bed of ZSM-5 catalyst in the presence of different diluent materials. The equilibrium mixture will contain methanol, dimethyl ether (DME) and water. From this plot of data it will be observed that the same trend occurs with different diluent materials as expressed above with respect to FIG. I. That is, the hydrocarbon materials comprising $C_1$ to $C_4$ hydrocarbons are more effective as diluents than water and the higher the molecular weight of the hydrocarbon diluent the more effective it is as a heat carrier or heat dissipating material.

FIG. III similarly to the above Figures, is a plot of the estimated data directed to showing the effect of different diluents on processing the equilibrium mixture obtained from a crude methanol containing 16 weight percent water. Similar trends are found in the data of FIG. III discussed with respect to FIGS. I and II.

Referring now to the process flow arrangement of FIG. IV, crude methanol in a liquid phase condition is charged to the process by conduit 2 communicating with pump 4. The methanol is compressed to about 160 psig in pump 4 and then passed by conduit 6 to heat exchanger 8 wherein the temperature of the liquid methanol is raised to about 400°F. The thus preheated methanol is vaporized in indirect heat exchanger 8 before it is passed by conduit 10 to the inlet of the dimethyl ether forming catalytic reactor 12. In catalyst containing reactor 12, a fixed bed of gamma alumina catalyst is maintained as a fixed bed of catalyst through which the methanol reactant passes downwardly through or as an annular bed of catalyst for radial flow of reactant material therethrough. A single down-flow fixed catalyst bed or a plurality of separate fixed downflow catalyst bed are arranged for converting the methanol feed under restricted temperature conditions as herein described to essentially an equilibrium product comprising methanol, dimethyl ether and water existing at a temperature of about 600°F. due to the exothermic temperature rise catalytically generated in the operation. The equilibrium product thus obtained may be construed as an ether rich product which is then passed by conduit 14 to a second reactor stage 16 housing one or more separate and sequentially arranged beds of a ZSM-5 type of crystalline zeolite. For the purpose of this specific discussion, the crystalline zeolite employed in the second reactor stage is a HZSM-5 crystalline zeolite.

In the combination operation herein described it is preferred to employ a low pressure drop catalyst system in reactor 16 and this may be accomplished by providing an annular bed catalyst for radial reactant flow therethrough or a plurality of relatively shallow sequentially arranged beds of catalyst may be employed for accomplishing the purpose desired. A diluent material introduced by conduit 18 is combined with the ether rich effluent obtained as hereinbefore discussed before contact of the mixture is made with the HZSM-5 crystalline zeolite catalyst under heat generating or exothermic reaction conditions controlled to restrict the temperature increase between the reactor inlet and reactor outlet not to exceed about 200°F. and preferably not to exceed about 300°F. The conversion of the ether rich effluent by the HZSM-5 catalyst is highly exothermic as discussed above and controlled within desired limits by use of the heat dissipating diluent material described above. During this highly exothermic operation the ether rich effluent or equilibrium mixture comprising dimethyl ether, methanol and water is controlled to effect the conversion thereof to gasoline boiling range components comprising aromatic and isoparaffins. The aromatic components comprising benzene, toluene and xylene are preferred components over the higher boiling durene aromatic material and every effort is made through temperature restraint, reactant partial pressure, space velocity and reactant plug flow operation to promote this end.

The product effluent of the HZSM-5 reaction zone 16 is passed through one or more cooling steps to reduce the temperature to a desired low temperature. In the specific arrangement of the figure the effluent is passed by conduit 20 to heat exchanger 22 wherein the effluent temperature is reduced to about 470°F. by indirect heat exchange with diluent material removed therefrom by conduit 18. The diluent will be at a temperature of about 600°F. The partially cooled effluent is removed from heat exchanger 22 and passed by conduit 24 to heat exchanger 26 wherein a further cooling of the effluent to about 440°F. is accomplished. The effluent is removed from heat exchanger 26 by conduit 28 for passage to another heat exchanger, in this instance heat exchanger 8 used for preheating the methanol charged to reactor 12. In the arrangement of the drawing the cooled effluent is then passed by conduit 30 to heat exchanger 32 wherein it is again passed in indirect heat exchange with diluent material recycled to the operation whereby the effluent temperature is reduced to about 180°F. before passing through additional stages of cooling provided by air cooler 34 and heat exchanger 36. Of course many other heat exchange arrangements may be provided for reducing the reactor effluent temperature from about 800°F. to about 100°F. before passage by conduit 38 to a low pressure separator 40. Low pressure separator 40 is maintained at a temperature of about 100°F. and a pressure of about 120 psig. In the low pressure separator a rough cut is made between gasiform diluent materials, desired aromatic and isoparaffin product and water. Water is withdrawn by conduit 42 and may be recycled as diluent if desired after suitable temperature adjustment. A gasiform product material lower boiling than desired gasoline boiling range constituents is withdrawn by conduit 44 and passed to a compressor 46. A plurality of parallel arranged gas compressors may be used for this purpose. The gasiform material is compressed by compressor 46 to a pressure of about 165 psig before it is passed by conduit 48 to a knock out drum 50 wherein a further separation is made between hydrocarbon diluent material for recyclization to reactor 16, water withdrawn by conduit 52 and gasoline boiling components recovered by conduit 54. The recovered material in conduit 54 is combined with gasoline boiling components recovered from separator 40 by conduit 56 and passed to a high pressure separator not shown. Gasiform hydrocarbon diluent material separated in drum 56 is passed by conduit 58 to heat exchanger 32 and then by conduit 60 to heat exchanger 22 so as to raise its temperature from about 100°F. to about 600°F. before admixture with the equilibrium effluent in conduit 14. It is to be understood that any number of different heat exchange arrangements may be relied upon to heat and cool primary stream above discussed without departing from the spirit and scope of the present invention.

Having thus generally described the present invention and discussed specific embodiments in support thereof, it is to be understood that no undue restrictions are to be imposed by reason thereof.

I claim:

1. In an exothermic conversion process relied upon for producing gasoline boiling range components from a methanol rich feed which comprises:
   passing preheated methanol feed in contact with a catalyst and under conditions selective for restricting the conversion of methanol to a product comprising dimethyl ether,
   combining a light hydrocarbon gasiform diluent with said product comprising dimethyl ether in an amount which will dissipate exothermic heat released upon subsequent contact with a ZSM-5 type crystalline zeolite conversion catalyst and
   contacting said ether comprising product and said light hydrocarbon diluent with a ZSM-5 type crystalline zeolite under conditions selective for converting said ether to products boiling in the gasoline boiling range.

2. The process of claim 1 wherein a sequence of fixed catalyst beds is relied upon to effect said conversions and the temperature of the effluent obtained from said first bed of catalyst is essentially catalyst limited.

3. The process of claim 1 wherein the product comprising dimethyl ether is in equilibrium with methanol and water and the total equilibrium mixture is passed with said diluent to said second stage of catalyst contact.

4. The process of claim 1 wherein a gamma alumina is relied upon to produce said product comprising dimethyl ether and a ZSM-5 type crystalline zeolite is employed to form gasoline boiling range components comprising aromatics and iso-paraffins.

5. The process of claim 1 wherein the ether comprising product is adjusted to a temperature of about 600°F. before contacting the crystalline zeolite catalyst.

6. The process of claim 1 wherein the hydrocarbon diluent comprises $C_5$ and lower boiling hydrocarbons.

7. The process of claim 1 wherein the crystalline zeolite is ZSM-5.

8. The process of claim 1 wherein sufficient diluent is employed to restrict the temperature of the effluent from the crystalline zeolite contact step not to exceed about 850°F.

9. The process of claim 1 wherein the methanol charge contains up to about 16 weight percent water.

* * * * *